March 13, 1962 C. VAN DER LELY ET AL 3,025,068
SPREADER FOR GRANULAR OR POWDERY MATERIAL
Filed April 21, 1958 3 Sheets-Sheet 1
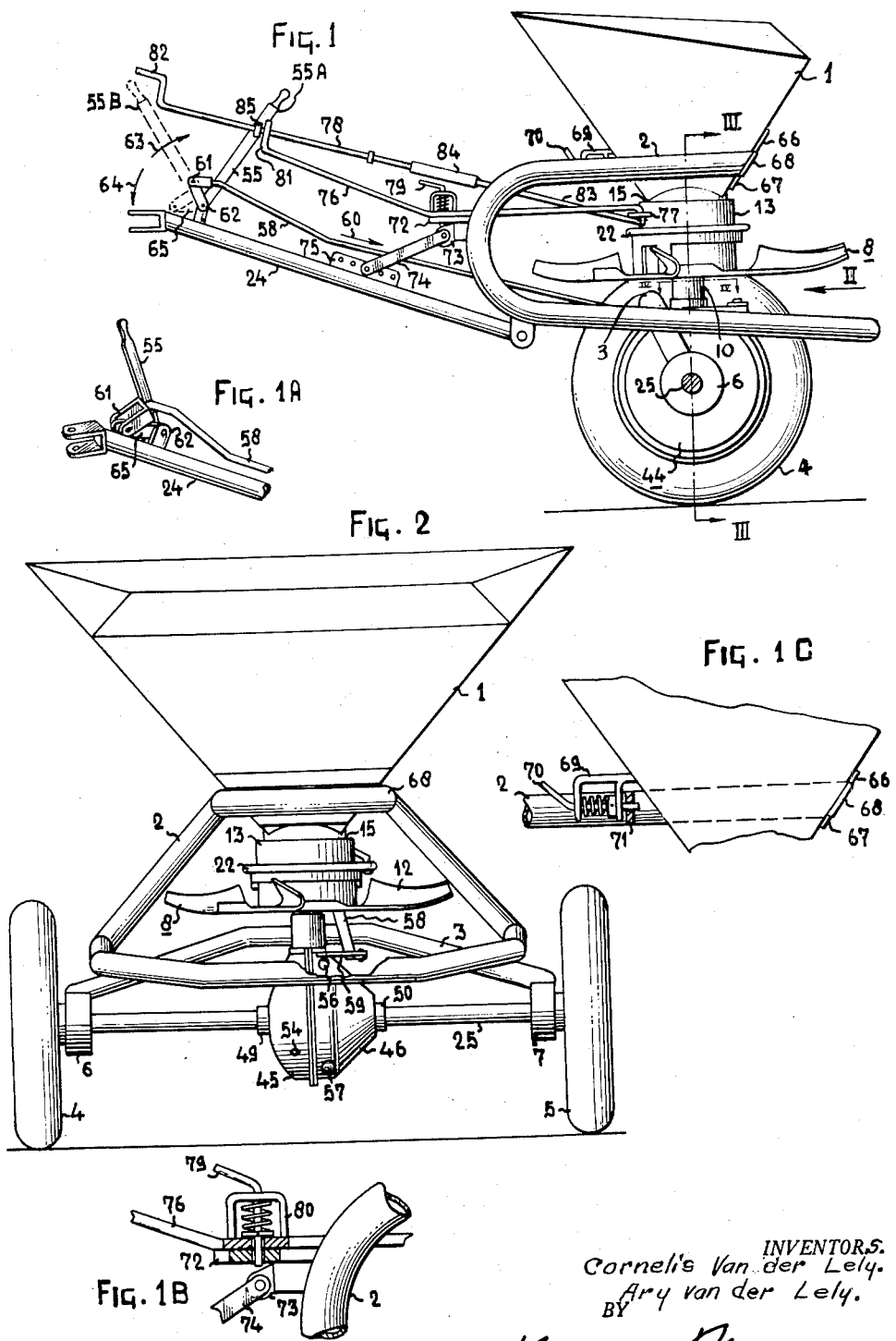
INVENTORS.
Cornelis Van der Lely.
Ary van der Lely.
BY Mason & Mason
Attorneys.

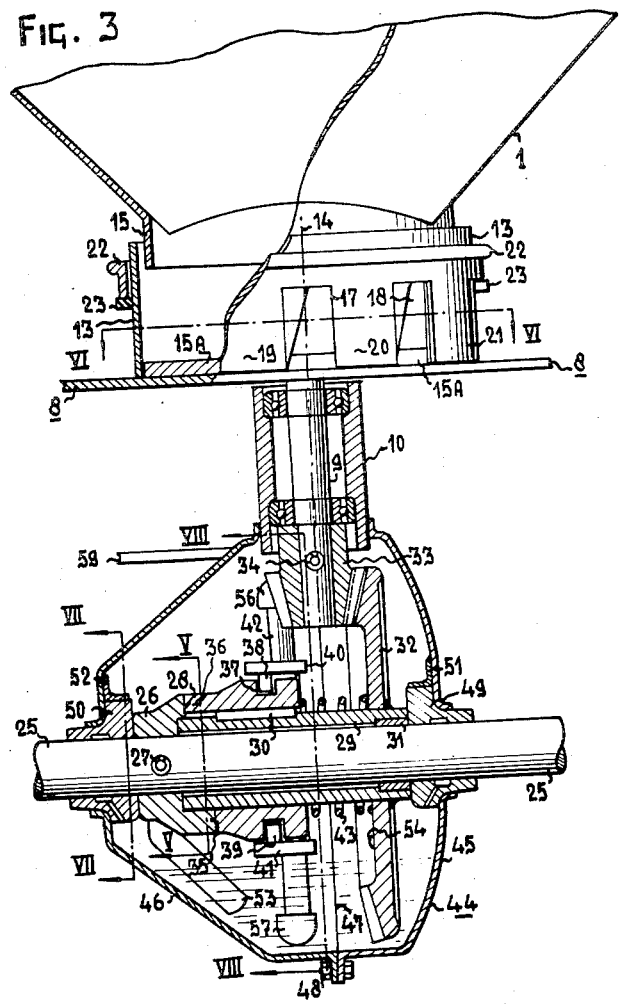

March 13, 1962   C. VAN DER LELY ET AL   3,025,068
SPREADER FOR GRANULAR OR POWDERY MATERIAL
Filed April 21, 1958   3 Sheets-Sheet 3
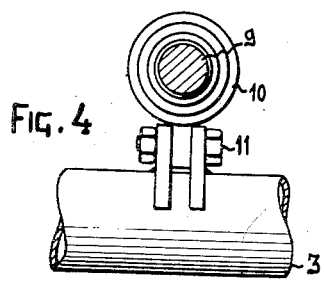
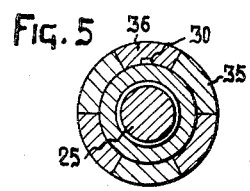
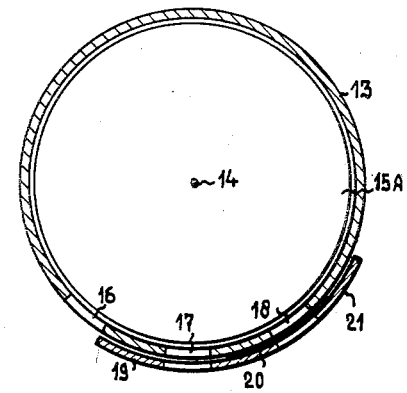
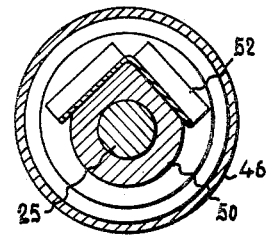
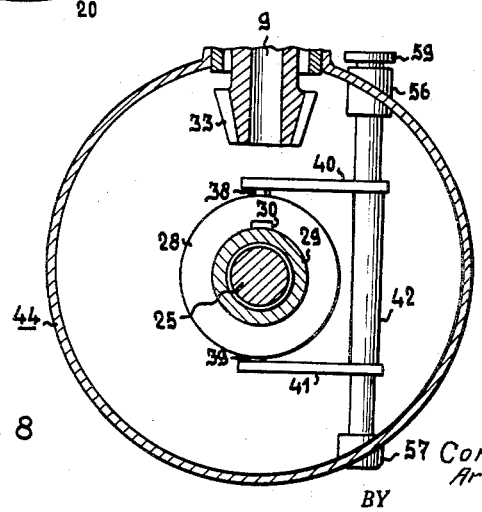
INVENTORS
Cornelis van der Lely,
Ary Van der Lely.
BY Mason & Mason
Attorneys.

United States Patent Office 3,025,068
Patented Mar. 13, 1962

3,025,068
SPREADER FOR GRANULAR OR POWDERY MATERIAL
Cornelis van der Lely and Ary van der Lely, Maasland, Netherlands, assignors to C. van der Lely N.V., Maasland, Netherlands, a Dutch limited liability company
Filed Apr. 21, 1958, Ser. No. 729,868
Claims priority, application Netherlands July 8, 1957
26 Claims. (Cl. 275—8)

This invention relates to devices for spreading granular or powdery material of the kind comprising a transportable frame with at least two supporting wheels and a rotatable spreading member, the driving mechanism of which can be engaged or disengaged with the aid of a clutch.

In order to rotate the spreading member, use is made in the existing devices of this kind of driving mechanism, which is not covered, or only covered in part, while a clutch, if any, for engaging and disengaging the driving mechanism is not covered, or is only covered in part. The insufficient covering of the driving mechanism and the clutch may give rise to soiling of these parts, so that much servicing is required. Particularly when the device is employed for spreading artificial fertilizers, this soiling of the driving mechanism will give rise to disturbances in the operation and to additional wear owing to the attack on the driving mechanism by the artificial fertilizers, which may adhere thereto.

In accordance with the invention the driving mechanism and the clutch are housed, in common, in a closed chamber, so that they are protected against soiling and unwanted wear is avoided; moreover, it is not necessary to clean the driving mechanism repeatedly, so that much time is saved. By housing the driving mechanism and the clutch in one chamber, the construction is simplified. An advantageous and simple embodiment of the device according to the invention is obtained by coupling the supporting wheels of the device by means of a shaft and by arranging both the clutch and part of the driving mechanism on the axle which links the supporting wheels to each other.

The invention furthermore relates to a device for spreading granular or powdery material, this device comprising a transportable frame with at least two supporting wheels, a container and a spreading member provided below the container and forming, at the same time, the bottom of the container, the connection between the container and the spreading member being constituted by a cylindrical ring, which bears on the spreading member and which is centered with respect to the rotary axis of the spreading member by a centering member provided on the spreading member. By centering the cylindrical ring in the manner according to the invention on the spreading member, the connection of this ring around the lower end of the container may have a certain amount of play, so that a very accurate disposition of the container over the spreading member is not required and the assembly of the device is thus facilitated.

In order to obtain a satisfactory closure between the cylindrical ring and the spreading member, the weight of the cylindrical ring, in an advantageous embodiment of the device according to the invention, is increased by causing the slides provided in front of the outlet apertures of the ring to bear on supports provided on the ring, so that the ring bears on the spreading member with a greater pressure and thus provides an improved closure.

The invention will now be described more fully with reference to one embodiment.

In the drawings:
FIGURE 1 is a side view of a device according to the invention, certain parts being broken away and shown in section for the sake of clarity;
FIGURE 1A is a detail view in perspective showing the forward end of the draw means, and a part of the clutch releasing means;
FIGURE 1B is an enlarged detail view, with parts broken away, of the means used to adjust the position of the annulus arranged around the lower end of the container;
FIGURE 1C is an enlarged detail view of the latching means which releasably holds the container in the frame member;
FIGURE 2 is a front elevation of the device shown in FIG. 1, viewed in the direction of the arrow II;
FIGURE 3 is a vertical sectional view taken on the line III—III of FIG. 1, with parts shown in elevation;
FIGURE 4 is a sectional view taken on line IV—IV of FIG. 1.
FIGURES 5, 6, 7 and 8 are sectional views taken on the lines V—V, VI—VI, VII—VII and VIII—VIII of FIG. 3, respectively.

Referring to the figures, the device comprises a container 1, which is supported by frame beams 2 and 3, which are supported by two running wheels 4 and 5, secured to axle 25 which is mounted in bearings 6 and 7 provided on the frame beam 3.

Below the container 1 is arranged an ejector disc comprising spreading member 8, which is rigidly seated on a shaft 9, which is journalled in a bearing 10, connected with the frame beam 3 by means of a bolt 11. The connection between the container 1 and the spreading member 8, which is provided with blades 12, comprises a cylindrical ring 13, which bears freely on the spreading member 8. It will be noted from the drawings that each of blades 12 has a cross-section which is roughly U-shaped and that the spreading member 8 together with blades 12 is slightly convex or cambered upwardly. In addition, blade 8, is, when viewed from above, cambered in that it is bent rearwardly with respect to the direction of rotation of member 12. This cylindrical ring is centered with respect to the rotary axis 14 of the spreading member 8 by means of a centering member, which is formed, in this embodiment, by a disc 15A, which is rigidly secured to the spreading member 8. By centering the cylindrical ring 13 in this manner relative to the axis 14, the ring 13 need not engage the cylindrical lower end 15 of the container 1 with great accuracy; there may be a space between the ring 13 and the lower end 15, so that the disposition of the container 1 over the spreading member 8 is simplified.

For the supply of the material from the container 1 to the spreading member 8 provision is made for discharge openings 16, 17, and 18 in the cylindrical ring 13. The quantity of the material to be supplied to the spreading member may be controlled by providing slide portions 19, 20 and 21 adapted to be moved in front of the discharge openings 16 to 18. These slides 19, 20 and 21 depend from a ring 22, which surrounds the ring 13. The weight of the ring 22 and of the slides 19 to 21 is supported by the ring 13, since the ring 22 bears on supporting members such as 23, secured to the ring 13. By increasing the weight of the ring 13 by the weight of the ring 22 and of the slides 19 to 21, the pressure of the ring 13 on the spreading member is increased, so that the closure between the ring 13 and the spreading member 8 is improved.

In order to obtain a rotation of the spreading member 8, when the device is moved by exerting a tractive force on the draw arm 24, connected with the frame beam 2, the shaft 9 is linked to the supporting wheels 4 and 5 by means of a driving mechanism and a clutch. The supporting wheels 4 and 5 are intercoupled by means of an axle 25, which is journalled in the bearings 6 and 7 and to which a clutch half 26 is secured by means of a stud 27, whereas a clutch half 28 is arranged on a sleeve 29 and is secured against rotation about the sleeve 29 by a spline 30. The sleeve 29 is journalled on the one hand in the clutch half 26 and on the other hand about the axle 25 by means of a bearing 31, provided in the sleeve 29. To the sleeve 29 is rigidly secured a conical gear wheel 32, which cooperates with a conical gear wheel 33, which is rigidly secured to the shaft 9 by means of a stud 34.

In order to engage and disengage the driving means of the spreading member 8, the claws 35 and 36 of the clutch halves 26 and 28, respectively, can be moved into and out of each other by displacing the clutch portion 28 over the sleeve 29. The clutch portion 28 is displaced over the sleeve 29 by means of a groove 37 in the said portion, in which studs 38 and 39 are arranged, and which connect with a shaft 42 by means of arms 40 and 41. By turning the shaft 42 through an angle, the clutch portion 28 is displaced along the sleeve 29. In order to prevent, in the engaged position, the claws 36 of the clutch portion 28 from sliding out of the claws 35 of the clutch portion 26, provision is made of a coil spring 43 between the gear wheel 32 and the clutch portion 28, which spring tends to hold the claws 36 constantly between the claws 35. In order to protect the driving mechanism constituted by the conical gear wheels 32 and 33, and the clutch from soiling, a chamber 44 is provided around the clutch and the driving mechanism, this chamber consisting of two halves 45 and 46, which engage each other in a plane 47, in which lies the axis 14, and which are secured to each other by bolts 48. The chamber halves 45 and 46 enclose the lower end of the bearing 10 of the shaft 9 and are journalled about the axle 25 by means of bearings 49 and 50, provided in the chamber walls 45 and 46.

The bearings 49 and 50 are secured against axial displacement in one direction, since they bear on the inner wall of the chamber with one surface; and they are secured against axial displacement in the other direction, since the clutch portions arranged on the axle 25 and the driving mechanism fill out the space between the bearings 49 and 50. The bearings 49 and 50 are furthermore secured against rotation in the chamber walls by means of strips 51 and 52, arranged over these bearings and formed by angle irons which engage flattened portions on the bearings. The axial force exerted by the gear wheel 32 is supported partly by the chamber wall 45, by the bearing 10, and partly by the chamber wall 46 transferred to the clutch portion 26, which is rigidly secured to the axle 25. The lubrication of the rotating parts in the chamber 44 is ensured by a quantity of oil in the chamber; the gear wheel 32 and an extension 53 provided on the clutch portion 26 moving through this oil spreads it over the parts to be lubricated. In the off-position of the spreading member, in which the gear wheel 32 does not move across the oil, the parts to be lubricated will yet receive oil from the extension 53, which is continuously rotating when the device moves, since it is rigidly secured to the clutch portion 26 arranged on the axle 25.

For filling the chamber 44, the wall 45 is provided with a filling opening 54, which can be closed by means of a stopper and which serves at the same time as an indicator for the desired level of the oil in the chamber 44. If the oil in the chamber 44 is to be replenished, this filling opening serves as a discharge for the old oil. In this case the device must be slightly turned about the axle 25 in order to move this opening below the level of the oil.

The clutch portion 28 can be actuated for engaging and disengaging the spreading member 8 by means of a lever 55, provided on the draw arm 24. The lever 55 is linked to the shaft 42, which is journalled in bearings 56 and 57 in the chamber wall 46, the said link being formed by a rod 58 and a lever 59. Since the spring 43 constantly urges the clutch portion 28 in one given direction, the shaft 42 will also always tend to rotate in one given direction in a manner such that in the disengaged position a force is exerted on the rod 58 in the direction of the arrow 60. The connection between the rod 58 and the lever 55 at point 61 is such that this point moves about the rotary axis 62 of the lever 55 during engagement and disengagement of the clutch, the force operating in the direction of the arrow 60 tending to move the point 61 about the axis 62 in the direction of the arrow 63 in the engaged position of the clutch and in the direction of the arrow 64 in the disengaged position. In the engaged position the lever 55 will remain in the position 55A, since the claws 36 of the clutch portion 28 lie completely between the claws 35 of the clutch portion 26. In the disengaged position the lever 55 will remain in the position 55B, since in this position the clutch portion 28 does not occupy a terminal position, but the lever arm 65 of the lever 55 engages the draw arm 24.

During the travel of the device, the gear wheel 32 and the extension 53 spray oil against the walls 45 and 46. The strips 51 and 52 prevent the oil dripping from the walls to penetrate between the walls 45 and 46 and the bearings 50 and 51, so that these strips serve at the same time as oil arresters.

As clearly shown in FIGURES 1 and 2, the blades 12 of the rotatable spreading member 8 are channel-shaped in cross section with the channel facing in the direction of rotation of the blades so that as the blades rotate, the seed, fertilizer, or other material will be thrown forwardly of the blades. The outer ends of the blades are curved upwardly at their outer ends so that the material to be spread will be thrown out above the wheels 4 and 5. This is necessary since as clearly shown in the drawing, the central portion of the member 8 lies in a plane below the tops of the wheels.

As shown in FIGURE 1, the container or hopper 1 is substantially conical in shape and has the rear portion of its upper rim bent inwardly to form a screen for any material scattering about. The container is also provided at its lower rear portion with guard strips or spaced plates 66 and 67 which form stop members between which the rear end of the upper frame member 68 engages when the container is in its operative position. The opposite side of the container is provided with a latch 69 which includes a spring actuated bolt 70 engageable in an aperture in a latch supporting strip or bar 71 spanning the upper sections of the frame member 2. Also spanning the spaced members of the frame member 2 at the front of the frame is a cross bar 72, which has a depending ear 73 to which is pivoted the upper end of a link 74. The other end of the link 74 is adjustably connected to a bar 75 carried by the draw arm 24. As shown in FIGURE 1, the bar 75 is provided with a series of apertures to receive a pin on the link 74 to adjust the position of the arm 24 with respect to the bar 72.

In order to control the position of the discharge openings in the ring 13 relative to the lower end 15 of the container, a rod 76 is connected to an ear 77 on the ring 13. As shown in FIG. 1, the rod 76 bears against the upper face of the cross bar 72 which is provided with a series of apertures, only one of which is shown, to receive a spring pressed pin 79 carried by a bracket 80 on the rod 76. As the rod 76 is shifted from one side to the other along the bar 72 the ring 13 will be shifted with respect to the lower end 15 of the container and the position of the discharge openings will be changed. The outer end of the rod 76 is bent at an angle at 81 and is provided with an aperture through which the rod 78 extends. The outer end of the rod 78 has a crank 82 and the inner end is threaded into and adjustably connected to an inner rod section 83 which is connected at its inner end to the ring 22. By a to and fro rocking movement of the rod 78, the ring 22 may be shifted on the ring 13 to loosen any accumulation of material adjacent the discharge openings. The effective length of the rod 78 may be varied by the amount the outer end is threaded into the sleeve portion 84 rigidly carried by the section 83. By varying the length of rod 78 the size of openings 16, 17 and 18 can also be varied. The rod 78 is also provided with a stop 85 to limit movement of the rod 78 in one direction through the aperture in the angle member 81.

The above description and drawings disclose one embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

What we claim is:

1. A device for spreading granular or powdery material, comprising a transportable frame supported on an axle and a pair of wheels, said axle being secured to said wheels and rotatable therewith, said frame having an upper and a lower section, a vertical shaft carried by said lower section and terminating at its lower end adjacent said axle, a gear on the lower end of said shaft adapted to be selectively engaged by a clutch member to a gear on said axle, a horizontally disposed spreader connected to the upper end of said shaft and rotatable therewith, a cylindrical ring bearing freely at one end on the upper face of said spreader, the wall of said ring having discharge openings for said material, a second ring telescoped over said first ring and having means to control the sizes of said discharge openings, supporting means secured to said first ring, said second ring bearing on said supporting means, a material container carried by the upper section of said frame and being open at its ends, the lower open end of said container projecting into said first ring so as to convey material supplied to the container to the spreader, and a draw means secured at one end to said frame and provided at its other end with means for attachment with a source of power.

2. A device as defined in claim 1, wherein said spreader comprises a flat central portion and a plurality of channel-shaped blades projecting from the edge of said central portion.

3. A device for spreading granular or powdery material comprising a transportable frame, a conical container open at both ends and carried by said frame, a spreader disposed below said container and adapted to receive granular or powdery material from said container, a cylindrical ring bearing freely on the upper face of said spreader, the wall of said ring having discharge openings for said material, a second ring telescoped over said first ring and having means to control the sizes of said discharge openings, said second ring being supported on said first ring and thereby increasing the pressure of the first ring on said spreader.

4. A device as defined in claim 3, wherein said spreader is provided with a means to center said first ring thereon, said means comprising a circular plate secured to said spreader between said blades.

5. A device as defined in claim 3, wherein means is provided to rock said second ring on said first ring to dislodge material accumulated adjacent said discharge openings.

6. A device as defined in claim 2, wherein said channel-shaped blades have their open sides disposed at their leading edges.

7. A device as defined in claim 3, wherein said container is provided with a latch means to releasably hold same on said frame.

8. A device as defined in claim 3, wherein the cylindrical ring is mounted between said spreader and said container with its upper end telescoped over the lower end of said container and its lower end engaging said spreader.

9. A device as defined in claim 8, wherein said spreader has channel-shaped blades, and said ring has discharge openings in its wall.

10. A device for spreading granular or powdery material, said device comprising an ejector disc adapted to rotate about an axis of rotation and a container having an outlet aperture, the ejector disc constituting at least part of the bottom of the container, characterized in that the parts of the container wall near the ejector disc are formed by an annulus which rests on the ejector disc.

11. A device as claimed in claim 10 characterized in that the annulus rests with its own weight on the ejector disc.

12. A device for spreading granular or powdery material over a surface, this device comprising an ejector disc rotating about an axis of rotation and a container, the material being discharged out of the container to the ejector disc, characterized in that the side wall of the container has at least two discharge apertures, said disc forming one side of each of said apertures.

13. A device for spreading granular or powdery material, this device comprising a container having one or more outlet apertures, and a rotatable ejector disc arranged below the container, characterized in that the container is supported by a frame which has a part located in a plane above the ejector disc, said frame extending away from the container over the ejector disc to the front side and then downwardly and rearwardly below the ejector disc to the rear side.

14. A device as claimed in claim 13, characterized in that said frame part carries a guard strip behind the container to protect the ejector disc.

15. A device as claimed in claim 13, characterized in that said frame part has a latch-supporting strip adjacent the front side of the container, said strip having spaced apertures therein, and a latch carried by said container for engagement in one of said apertures to lock said container on said frame.

16. A device as claimed in claim 12, the device being supported by at least two running wheels, between which the ejector disc is mounted, characterized in that the ejector disc lies at least partly on a lower level than the highest points of said running wheels.

17. A device as defined in claim 1 having a housing incorporating walls which encloses said gears and said clutch member and forms a lubricant chamber therefor, and said axle extends through and is journalled in the walls of said housing.

18. A device for spreading granular or powdery material, comprising a transportable frame, a substantially vertical shaft carried by said frame, a horizontally disposed spreader connected to said shaft and adapted to rotate, a cylindrical ring bearing freely at one end on the upper face of said spreader, the wall of said ring having discharge openings for said material, a material container being open at its lower end, the lower open end of said container projecting into said ring so as to convey material supplied to the container to the spreader.

19. A device as defined in claim 18, wherein a second ring is provided telescoped over said first ring and having means to control the sizes of said discharge openings, supporting means secured to said first ring, said second ring bearing on said supporting means.

20. A device as defined in claim 18, wherein said frame is provided with an upper and a lower section, said vertical shaft being carried by said lower section and said container by said upper section, a gear or the like being secured to the lower end of said shaft adapted to be selectively engaged by driving means.

21. A device as defined in claim 18, wherein said transportable frame is supported on an axle and a pair of wheels, said axle being secured to said wheels and rotatable therewith, said shaft being terminated at its lower end adjacent said axle, a gear on the lower end of said shaft adapted to be selectively engaged by a clutch member to a gear on said axle.

22. A device for spreading granular or powdery material comprising a transportable frame supported on an axle and a pair of wheels, said axle being secured to said wheels and rotatable therewith, said frame having an upper and lower section, a vertical shaft carried by said lower section and terminating at its lower end adjacent said axle, a gear on the lower end of said shaft adapted to be selectively engaged by a clutch member to a gear on said axle, a housing enclosing said gears and said clutch member and forming a lubricant chamber therefor, said axle extending through and being journalled in the walls of said housing, oil distributing means provided for said axle to distribute oil from said lubricant chamber to said clutch and said gears, a horizontally disposed spreader connected to the upper end of said shaft and rotatable therewith, a cylindrical ring bearing freely at one end on the upper face of said spreader, the wall of said ring having discharge openings for said material, a second ring telescoped over said first ring and having means to control the sizes of said discharge openings, supporting means secured to said first ring, said second ring bearing on said supporting means, a material container carried by the upper section of said frame and being open at its ends, the lower open end of said container projecting into said first ring so as to convey material supplied to the container to the spreader, and a draw means secured at one end to said frame and provided at its other end with means for attachment with a source of power.

23. In a device for spreading granular or powdery material, a container, a frame for supporting said container, said container having at one side fixed means shaped to engage other fixed means on said frame and on the other side a pin securing said container on said frame, and said container being detachably secured to said frame at substantially the forward and aft sides of said container.

24. A device as claimed in claim 13, characterized in that the frame comprises substantially one bowed frame beam.

25. A device as claimed in claim 3 wherein said means to control the sizes of said discharge openings includes selective means to secure said first ring in different positions relative to said second ring.

26. A device as claimed in claim 10 having a ring member telescoped over said annulus, a frame interconnected to said container, and control means to control the size of said outlet aperture comprising an arm connected to said annulus, and securing means associated with said arm and said frame, said arm being movable with respect to said frame whereby said arm can be selectively fastened relative to said frame by said securing means.

References Cited in the file of this patent

UNITED STATES PATENTS

| | | |
|---|---|---|
| 631,358 | Campbell | Aug. 22, 1899 |
| 892,553 | Roby | July 7, 1908 |
| 932,741 | Wylie | Aug. 31, 1909 |
| 1,011,071 | Mehlberger | Dec. 5, 1911 |
| 1,107,992 | Parrish | Aug. 18, 1914 |
| 1,166,476 | Parrish | Jan. 4, 1916 |
| 1,166,477 | Parrish | Jan. 4, 1916 |
| 1,389,402 | Vogel | Aug. 30, 1921 |
| 1,789,874 | Lilly | Jan. 20, 1931 |
| 2,162,103 | Middleton | June 13, 1939 |
| 2,512,955 | Martin | June 27, 1950 |
| 2,661,955 | Sherer | Dec. 8, 1953 |
| 2,672,259 | Hobgood | Mar. 16, 1954 |
| 2,676,695 | Steele | Apr. 27, 1954 |
| 2,766,872 | Pillsbury | Oct. 16, 1956 |
| 2,770,354 | Morrison | Nov. 13, 1956 |

FOREIGN PATENTS

| | | |
|---|---|---|
| 683,299 | Great Britain | Nov. 26, 1952 |